(12) United States Patent
Miller et al.

(10) Patent No.: US 8,235,201 B2
(45) Date of Patent: Aug. 7, 2012

(54) FLIGHT BAR ASSEMBLY, APPARATUS AND METHODS FOR NESTABLE COLLATION OF OBJECTS

(75) Inventors: John Griffin Miller, Easley, SC (US);
Gregory Bruns, Moore, SC (US);
Mathias Coulomb, Greenville, SC (US)

(73) Assignee: Illinois Tool Works Inc., Glenview, IL (US)

( * ) Notice: Subject to any disclaimer, the term of this patent is extended or adjusted under 35 U.S.C. 154(b) by 221 days.

(21) Appl. No.: 12/490,967

(22) Filed: Jun. 24, 2009

(65) Prior Publication Data
US 2010/0326015 A1 Dec. 30, 2010

(51) Int. Cl.
*B65G 47/26* (2006.01)

(52) U.S. Cl. .................. 198/419.3; 198/418; 53/543

(58) Field of Classification Search .................. 198/418, 198/418.7, 418.8, 419.3, 429, 430; 53/543
See application file for complete search history.

(56) References Cited

U.S. PATENT DOCUMENTS

| | | | |
|---|---|---|---|
| 2,535,880 A | 12/1950 | Tomkins | |
| 2,949,179 A | 8/1960 | Busse | |
| 2,955,707 A | 10/1960 | Foote | |
| 3,522,890 A | 8/1970 | Birchall | |
| 3,570,685 A | 3/1971 | Carlson | |
| 3,612,299 A | 10/1971 | Shaw et al. | |
| 3,619,967 A * | 11/1971 | Alduk | 53/543 |
| 3,645,410 A | 2/1972 | Powell | |
| 3,659,726 A | 5/1972 | Anderson | |
| 3,718,246 A | 2/1973 | Dardaine et al. | |
| 3,760,557 A * | 9/1973 | McIntyre | 198/419.3 |
| 3,788,497 A | 1/1974 | Carlson | |
| 3,834,117 A * | 9/1974 | Gift | 53/543 |
| 3,872,647 A * | 3/1975 | Langen et al. | 198/419.3 |
| 3,934,713 A | 1/1976 | Van der Meer et al. | |
| 4,041,677 A * | 8/1977 | Reid | 53/543 |
| 4,098,050 A | 7/1978 | Dietz et al. | |
| 4,237,673 A | 12/1980 | Calvert et al. | |
| 4,637,509 A | 1/1987 | Raudat et al. | |
| 4,756,139 A | 7/1988 | Le Bras | |
| 4,782,955 A | 11/1988 | Weaver et al. | |
| 4,834,605 A | 5/1989 | Jerred | |
| 4,850,479 A | 7/1989 | Bird | |

(Continued)

FOREIGN PATENT DOCUMENTS

GB 2324075 10/1998

OTHER PUBLICATIONS

International Search Report for PCT/US2010/035372—4 pages.

*Primary Examiner* — James R Bidwell
(74) *Attorney, Agent, or Firm* — Dority & Manning, P.A.

(57) ABSTRACT

Apparatus, flight bar assemblies, and methods are disclosed for nesting objects into a substantially staggered arrangement. Such nesting may be done in a nesting zone of a machine, for example, just upstream of a shrink wrapping machine. The nested arrangement allows the grouping of nested objects to be shrink-wrapped without use of trays or cardboard blanks if desired. The flight bar assemblies may include movable spacers for orienting rows of objects before, during, and after nesting. Lane dividers may be provided having lengths corresponding to a contour of an outer guide and cam surface, cooperating with the lane dividers to selectively urging the rows of objects inward in an organized fashion to allow efficient and reliable nesting.

23 Claims, 14 Drawing Sheets

U.S. PATENT DOCUMENTS

| | | |
|---|---|---|
| 4,915,217 A | 4/1990 | Karabedian et al. |
| 4,934,508 A | 6/1990 | Vander Meer et al. |
| 4,936,077 A | 6/1990 | Langen et al. |
| 5,065,670 A | 11/1991 | Leiweke |
| 5,080,551 A | 1/1992 | Jerred |
| 5,238,101 A | 8/1993 | Ota et al. |
| 5,267,644 A | 12/1993 | Tsao |
| 5,271,709 A | 12/1993 | Vander Meer et al. |
| 5,320,457 A | 6/1994 | Vander Meer et al. |
| 5,328,021 A | 7/1994 | Calvert et al. |
| 5,360,099 A | 11/1994 | Culpepper et al. |
| 5,369,942 A | 12/1994 | Olson |
| 5,443,298 A | 8/1995 | Finley et al. |
| 5,477,655 A | 12/1995 | Hawley |
| 5,522,692 A | 6/1996 | Simkowski |
| 5,546,734 A | 8/1996 | Moncrief et al. |
| 5,667,055 A | 9/1997 | Gambetti |
| 5,853,088 A | 12/1998 | Saulas et al. |
| 5,904,026 A | 5/1999 | Irvine |
| 6,039,181 A | 3/2000 | Whiteside |
| 6,360,873 B1 * | 3/2002 | Bonnain et al. ............ 198/419.3 |
| 6,688,839 B1 | 2/2004 | Hirschek et al. |
| 6,793,064 B2 | 9/2004 | Schoeneck et al. |
| 6,837,360 B2 | 1/2005 | Schoeneck |
| 7,073,656 B2 | 7/2006 | Gust et al. |
| 7,100,762 B2 | 9/2006 | Marco |
| 7,128,217 B2 * | 10/2006 | Henry ........................ 198/418.7 |
| 7,392,894 B2 * | 7/2008 | Jacob et al. ................ 198/419.3 |
| 7,775,348 B2 | 8/2010 | Olsen et al. |
| 2004/0055905 A1 | 3/2004 | Marco et al. |
| 2005/0279650 A1 | 12/2005 | Marco |
| 2006/0086063 A1 | 4/2006 | Magomedov |

* cited by examiner

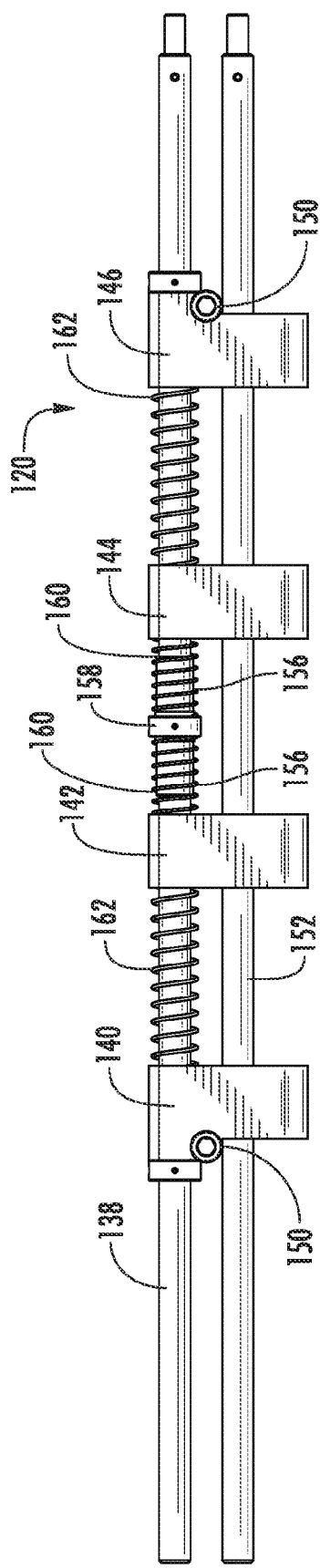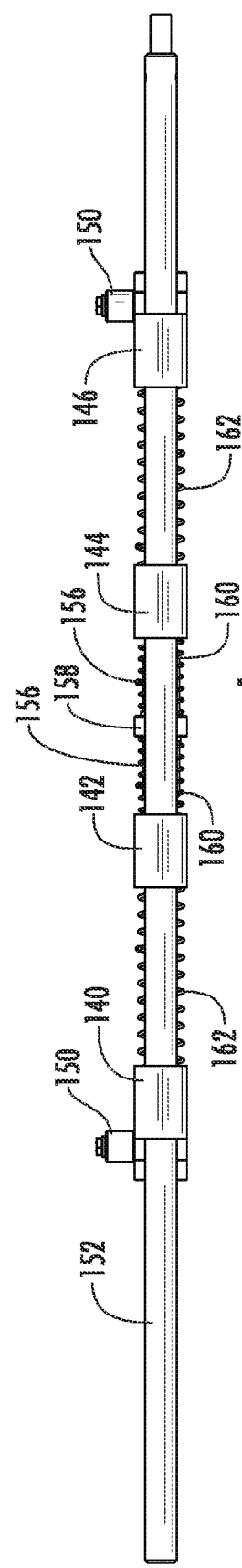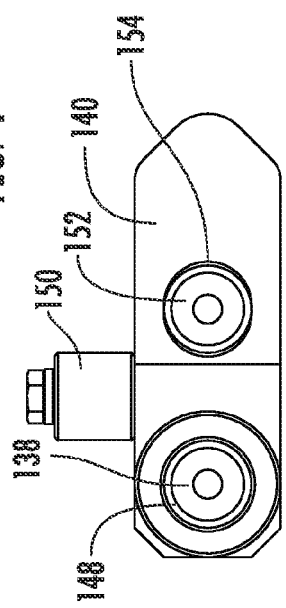

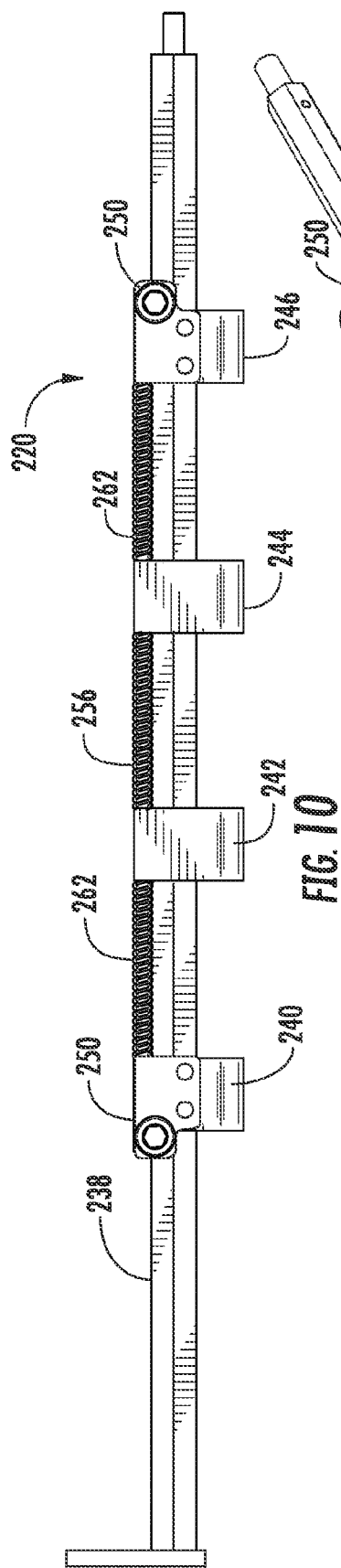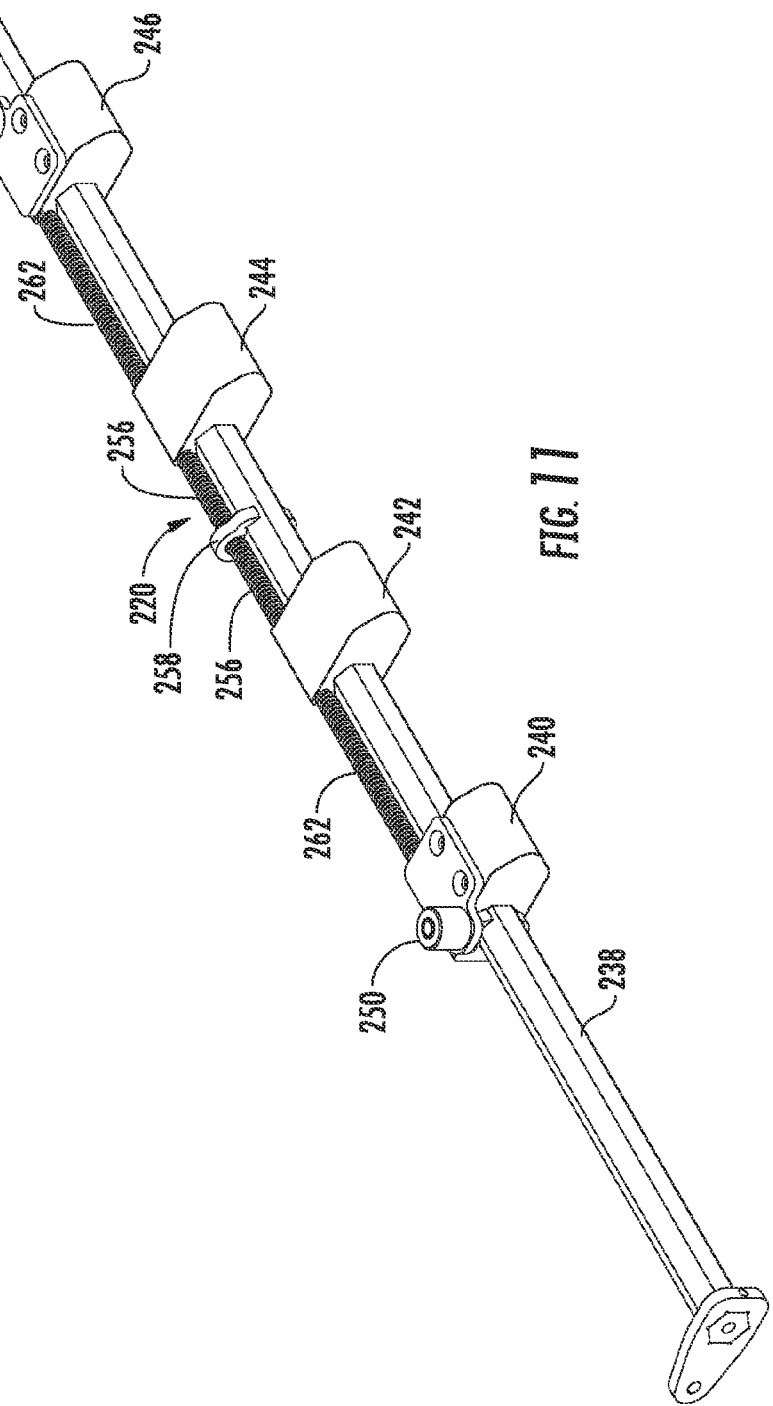

FLIGHT BAR ASSEMBLY, APPARATUS AND METHODS FOR NESTABLE COLLATION OF OBJECTS

TECHNICAL FIELD

The present disclosure relates to flight bar assemblies, apparatus and methods for nestably collating objects.

BACKGROUND

Various methods and devices have been proposed for grouping and holding objects such as containers for shipping. For example, paperboard or cardboard cartons, boxes and trays, stretch wrapping and shrink wrapping, as well as combinations of the above have been employed. Various types of machines have been developed to feed, group, and package such containers.

When shrink wrapping is employed, often objects are grouped on a cardboard tray having folded up edges before applications and shrinking of the shrink film. Such trays are employed to provide stability during loading, shrink wrapping and shipment. Trays are typically rectangular, with four folded-up sides to. The edges are typically glued and/or stapled to hold them in the desired form. The articles, if all of the same type, are typically arranged in a grid on the tray. Twenty-four bottles could be arranged in a 4×6 grid on a tray, for example. Alternatively, blanks in the form of rectangular sheets of cardboard (without the folded up edges) have also been used to provide similar benefits.

Such packaging while generally effective has certain drawbacks. For example, using cardboard and shrink film requires more raw materials and resources than using either alone, and requires complicated machinery to organize and assemble a shrink-wrapped package of objects. Also, at times it can be difficult to create machinery that allows for flexibility in packaging of objects in different configurations and or groupings. That is, major changes have been required in order to change a packaging line if a change in product or grouping is desired. Also, use of such trays and blanks typically results in only an orthogonal grid arrangement matching the dimensions of the trays and blanks. In such arrangements, inherently due to the grid organization, interior objects may contact directly only four adjacent objects.

Accordingly, there remains a need for improved flight bar assemblies, apparatus and methods for collation of objects.

SUMMARY

In accordance with some aspects of the present subject matter, an apparatus is disclosed for nesting objects in a substantially staggered arrangement, the objects being received from an object feed in a plurality of groups in substantially parallel rows extending along a feed direction, the nesting apparatus including a flight bar drive, a flight bar assembly including a flight bar extending laterally across the feed direction and driven by the flight bar drive through a nesting zone in the feed direction, the flight bar pushing the plurality of groups through the nesting zone, the flight bar assembly including at least one spacer extending forward of the flight bar when in the nesting zone for contacting an object in one of the groups to push the one group forward of others of the groups, the spacer being slidable laterally along the flight bar as the flight bar moves through the nesting zone, the spacer maintaining contact with the object in the one of the groups as the spacer slides laterally, the spacer having a lateral width approximately equaling a width of one of the objects, the spacer extending forward of the flight bar a length approximately equal to one-half of the width of one of the objects, and at least one guide extending along one side of the nesting zone, the guide having a contact surface for moving at least one of the groups of objects laterally within the nesting zone while the flight bar pushes all of the groups through the nesting zone, wherein the flight bar, the spacer on the flight bar, and the guide are configured with respect to the objects so as to cooperate in nesting the objects into a substantially staggered arrangement during travel through the nesting zone. Various options and modifications are possible.

For example, the flight bar assembly may include a spring member for urging the spacer laterally outward toward the guide, and may also include a cam follower, the cam follower being urged laterally inward thereby compressing the spring member as the flight bar moves through the nesting zone. The flight bar assembly may further include a second spacer slidably disposed on the flight bar laterally between the spacer and the guide, the spring member being disposed between a central anchor and the spacer and having a first spring constant, the flight bar assembly further including a second spring member disposed between the spacer and the second spacer and having a second spring constant, the spring constant of the spring and the spring constant of the second spring being inversely proportional to a distance moved by the respective spacer and second spacer. If desired, the cam follower may be located on the second spacer. Also, a second guide may be located opposite the guide, the guide and the second guide having respective contact surfaces that are nearer each other in a downstream portion of the nesting zone.

A plurality of lane dividers may extend along the feed direction into the nesting zone, each lane divider disposed between two of the rows. If desired, the lane dividers may extend to differing lengths within the nesting zone. For example, the lane dividers in a central portion of the nesting zone may extend further than the lane dividers in lateral portions of the nesting zone.

A dead plate may be disposed beneath a substantial portion of the nesting zone, and a plurality of single-row conveyors may be disposed upstream of the dead plate for feeding the objects to the nesting zone and a single nested-group conveyor disposed downstream of the dead plate for transferring nested groups of objects from the nesting zone.

The flight bar and spacer may be cooperatively configured so as to substantially prevent rotation of the spacer relative to the bar while pushing the objects. For example, the flight bar may have a non-circular cross-section, or the flight bar assembly may include an orienting bar extending parallel to the flight bar and through the spacer.

According to other aspects of the disclosure, a flight bar assembly is disclosed for a nesting assembly configured for pushing objects in a feed direction while allowing lateral movement so as to achieve a staggered nesting pattern, the flight bar assembly including a flight bar extending laterally across the feed direction, a plurality of spacers extending in the feed direction from the flight bar, at least one of the spacers being a slidable spacer that is laterally slidable along the flight bar, the spacers having a lateral width less than a width of the one of the objects, the spacers extending forward of the flight bar a length approximately equal to one-half of the width of one of the objects, a least one compression spring for urging the slidable spacer toward an end of the flight bar and away from a center of the flight bar, and a cam follower operatively engaged with the slidable spacer, whereby pushing the cam follower toward the center of the flight bar slides the slidable spacer toward the center of the flight bar by compressing the compression spring member. Again, various options and modifications are possible.

For example, the centers of the spacers may be disposed a first distance apart when the compression spring is in a default position and a smaller second distance apart when the compression spring is moved inward by the cam follower, and the first distance may correspond to two times the width of one the objects and the second distance corresponds to less than two times the width of the one of the objects. Also, the second distance may correspond to the lateral distance between the centers of three rows of the objects nested hexagonally.

The flight bar and spacers may be cooperatively configured so as to substantially prevent rotation of the spacers relative to the bar while pushing the objects. As such, the flight bar may have a non-circular cross-section, or the flight bar assembly may include an orienting bar extending parallel to the flight bar and through the spacer.

If desired, a second one of the spacers may also be slidable, the second spacer slidably disposed on the flight bar laterally between the spacer and the guide, the compression spring being disposed between a central anchor and the spacer and having a first spring constant, the flight bar assembly further including a second spring member disposed between the spacer and the second spacer and having a second spring constant, the spring constant of the spring member and the spring constant of the second spring member being inversely proportional to a distance moved by the respective spacer and second spacer.

According to other aspects of the disclosure, a method of nesting objects includes feeding objects in a feed direction in a plurality of rows into a nesting zone; selectively maintaining separation of the rows via a lane dividers between the rows, the lane dividers having differing lengths extending into the nesting zone; pushing the rows of objects into the nesting zone using a flight bar assembly, the flight bar assembly having a flight bar and spacers extending forward from the flight bar in the feed direction, at least one of the spacers being a slidable spacer that is laterally slidable along the flight bar, the spacers having a lateral width less than a width of the one of the objects, the spacers extending forward of the flight bar a length approximately equal to one-half of the width of one of the objects, the spacers arranged to contact and push every other row of the objects with a row of the objects in between; and sliding at least some of the spacers laterally inward relative to the flight bar while in the nesting zone as the rows of objects exit the lane dividers while urging the outermost rows of objects inward to achieve a staggered nested arrangement of objects. Again, various options and modifications are possible.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

FIG. 3 is a top view of one possible flight bar assembly for a nesting assembly;

FIG. 4 is front view of the flight bar assembly of FIG. 3;

FIG. 5 is an end view of the flight bar assembly of FIG. 3;

FIG. 10 is a top view of another possible flight bar assembly;

FIG. 11 is a perspective view of the flight bar assembly of FIG. 10;

Use of like reference numerals in different features is intended to illustrate like or analogous components.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to apparatus, flight bar assemblies, and methods for nesting objects such as containers into a substantially staggered arrangement. The nested arrangement may be in a symmetrical honeycomb or hexagonal relationship or something else. Such nesting may be done in a nesting zone of a machine, for example, just upstream of a shrink wrapping machine. The nested arrangement allows the grouping of nested objects to be shrink-wrapped without use of trays or cardboard blanks, if desired. The flight bar assemblies may include movable spacers for orienting rows of objects before, during, and after nesting. Lane dividers may be provided having lengths corresponding to a contour of an outer guide and cam surface, cooperating with the lane dividers to selectively urge the rows of objects inward in an organized fashion to allow efficient and reliable nesting.

Figure 1:
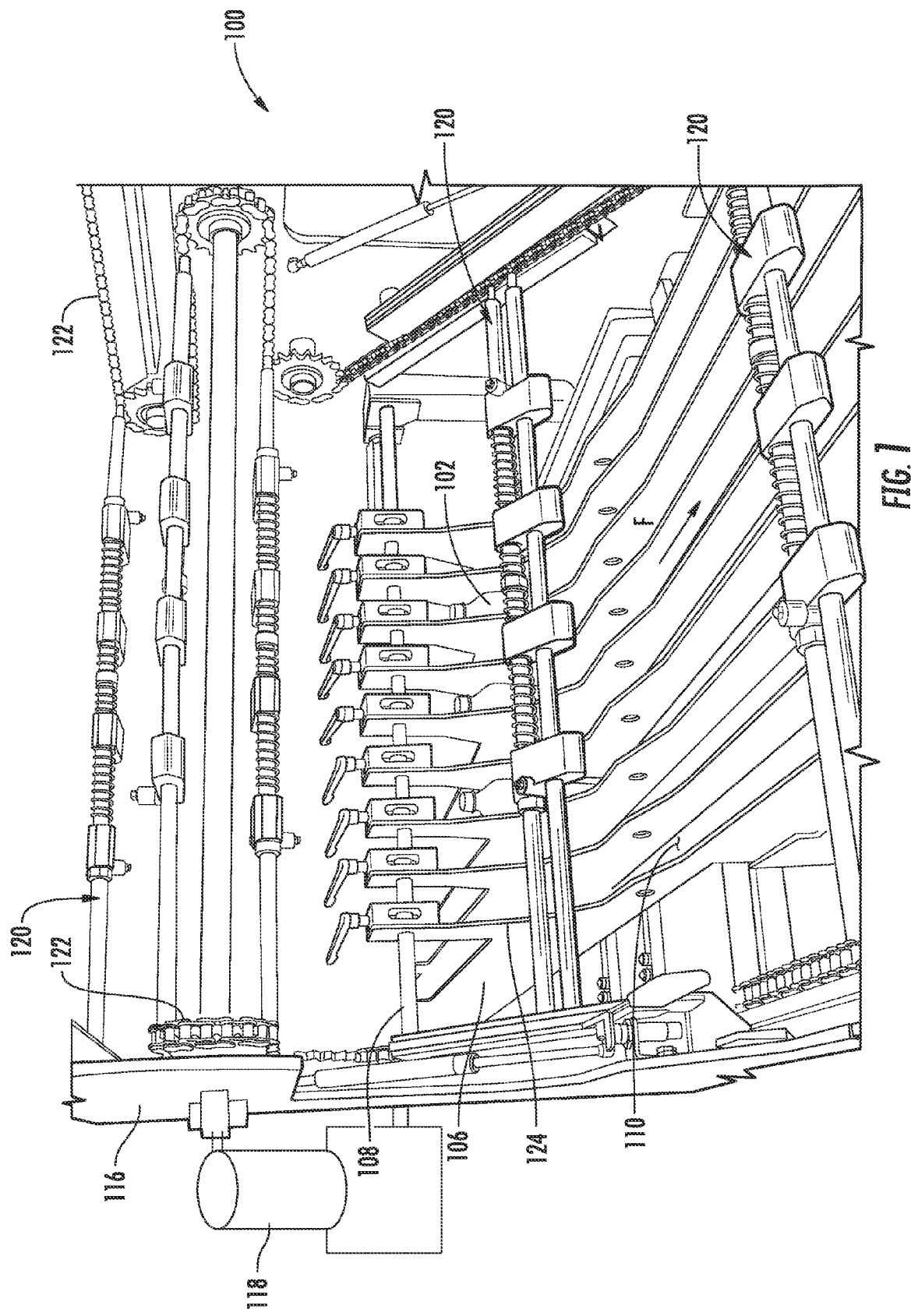
FIG. 1 is a perspective view of an upstream portion of a nesting assembly.
Figure 2:
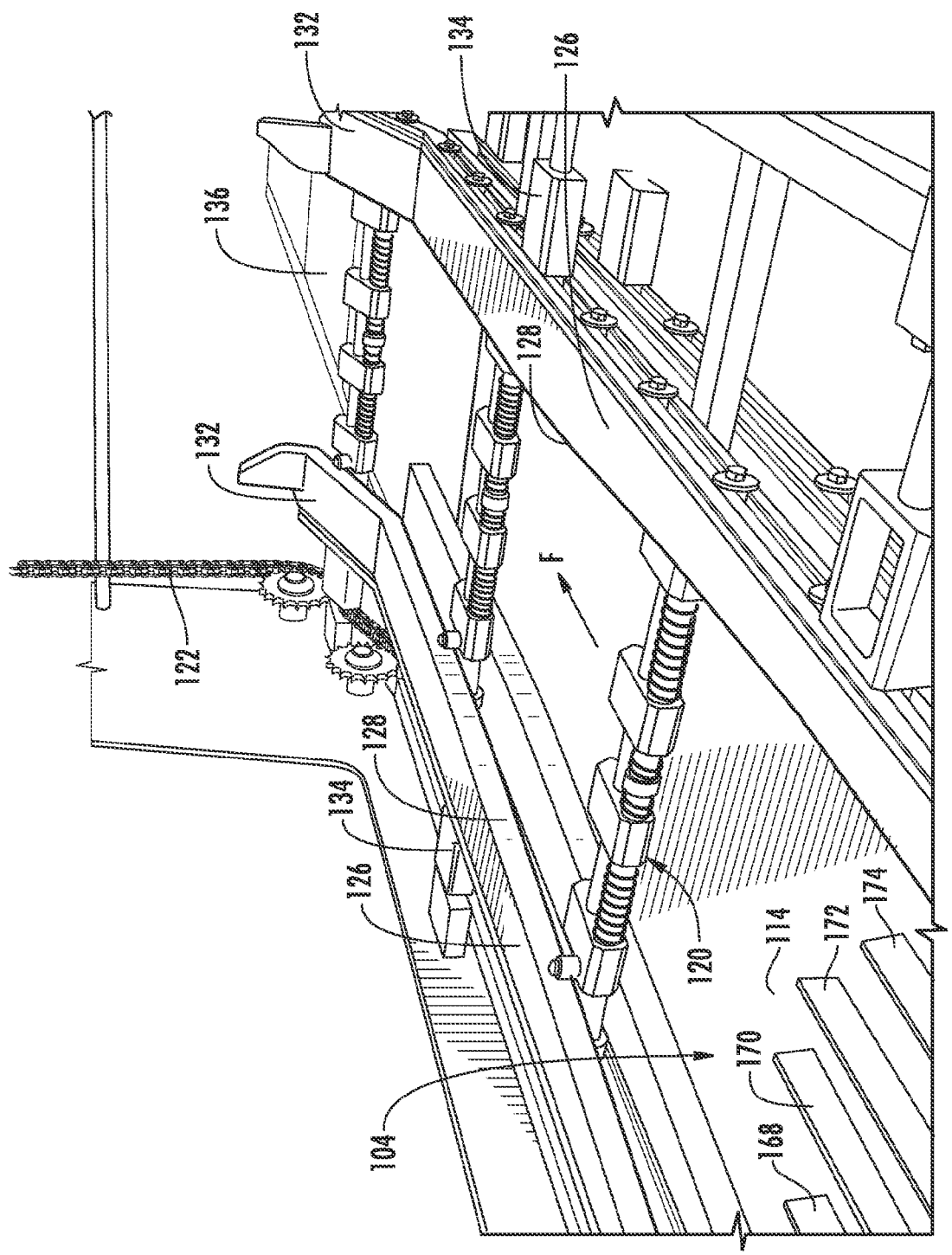
FIG. 2 is a perspective view of a downstream portion of the nesting assembly of FIG. 1.

FIGS. 1 and 2 show an apparatus 100 for receiving a plurality of rows of objects 102 such as containers and nesting them along a feed direction F within a nesting zone 104. The rows are defined by upstream dividers 106 which are adjustably positioned along a positioning bar 108 by conventional clamps. FIG. 1 shows eight rows 110 between nine dividers 106, but it should be understood that various numbers and widths may be employed. In fact, if the apparatus is set up for eight rows, all rows need not be used (without modification of the apparatus) if fewer rows are desired in a resulting nested package. Rows 110 are fed by individual conveyors 112 (see FIG. 7) that lead to a dead plate 114 in nesting zone 104. If desired dead plate 114 could be a moving conveyor or could be modified, for example with rollers, air jets, etc.

Frame 116 of apparatus 110 also supports a drive 118 (a conventional electric motor gearing, etc.) for moving flight bar assemblies 120 through nesting zone 104. As shown, flight bar assemblies 120 are mounted on two chains 122 on either side of nesting zone 104 driven by drive 118. Upstream dividers 106 include a contoured edge 124 and chains 122 follow a path allowing flight bar assemblies 120 to drop down to contact the objects at the beginning of the nesting process.

Side guides 126 are provided in nesting zone 104 to assist in moving the objects into a nested configuration. The assistance may be provided by contact with the objects and/or by movement of slidable portions of the flight bar assemblies 120. Guides 126 include contact surfaces 128 that taper inwardly toward each other along feed direction F. Downstream ends 132 of guides 126 extend first upwardly then outwardly so that compressed portions of flight bar assemblies 120 may be released smoothly without interfering with the objects after nesting and as so as to follow chains 122. Guides 126 are laterally adjustable via conventional mounting hardware 134 so as to define a width of nesting zone 104, including defining the number of active rows used. Downstream of nesting zone 104 is a conveyor 136 leading to a further station 130, such as a shrink wrap station.

FIGS. 3-5 show one example of a flight bar assembly 120 including a flight bar 138 and a number of spacers 140, 142, 144, 146 having openings 148 for receiving the flight bar. Outer spacers 140 and 146 include cam followers 150. Structure is provided to keep the spacers from rotating on flight bar 138, in this case a second orienting bar 152 extending through openings 154 in the spacers. Both bars 138 and 152 are attached at their ends to chains 122 in a conventional way so as to be drivable by the chains while maintaining a front-back orientation.

First spring members 156 are provided between an anchor 158 and spacers 142 and 144. If desired a single spring member could be used here. Spring members 156 may be conventional compression springs. Spacers 142 and 144 may move inwardly by compressing spring members 156 until stop portions 160 are reached at a preselected distance corresponding to the width of the objects 102.

Second spring members 162 are provided laterally outward of first spring members 156 between spacer pairs 140 and 142, and 144 and 146. Accordingly, if cam followers 150 are moved inwardly by a cam surface such as surfaces 128 of guides 126, then all springs shown are compressed and all sliders shown are moved inward. Preferably, inner spacers 142 and 144 move inward until contacting stops 160 and outer spacers 140 and 146 move a correspondingly greater amount, as will be described below. Also, the spring constants of the springs can be selected so that either the first or second springs compress first and/or more once cam followers 150 are moved inward, as will be discussed below. Also, it should be understood that various modifications in the number and dimension of spacers and placement of the springs may be employed depending on the desired nested package configuration, number and size of objects, etc.

Figure 6:
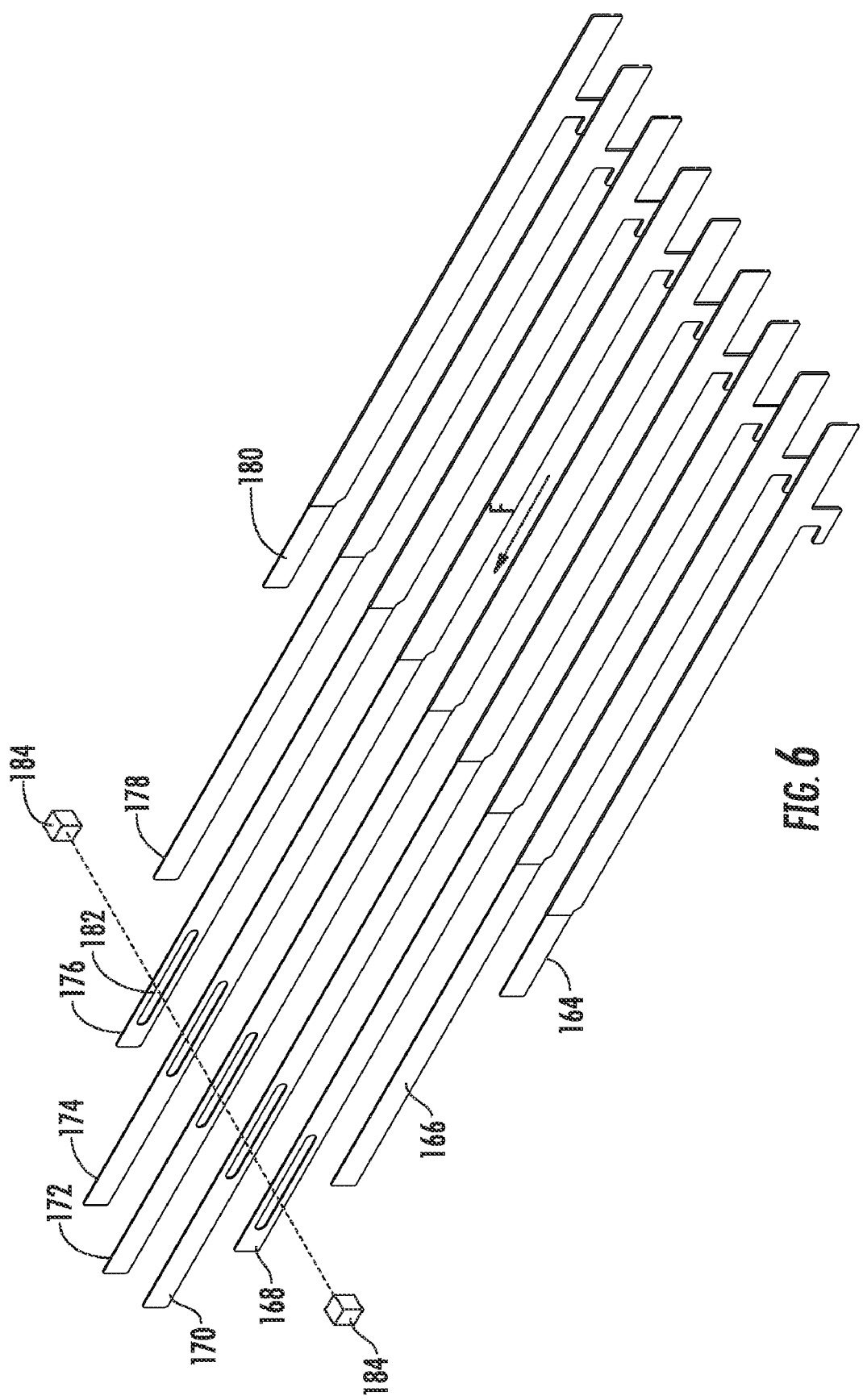
FIG. 6 is a perspective view of on possible lane divider arrangement for a nesting assembly.

FIG. 6 shows lane dividers 164-180 that could be used for an eight or ten row 110 system. As shown, the length of the dividers increases from both outer dividers 164 and 180 toward central divider 172. As discussed below, such arrangement allows for nesting of outer rows first within the nesting zone, as objects can begin nesting with adjacent rows once passing the end of an intervening lane divider. Accordingly, by selecting an arrangement of lengths of the lane dividers in combination with the contour of the outer guide surfaces 128, an organized and reliably reproducible nesting of rows can be accomplished. Lane dividers 164-180 may or may not be unitary with the upstream dividers. The down stream ends of the lane divides may also extend distally so as to allow lateral flexing during nesting. If desired, lane dividers 164-180 may be individually removable and replaceable to suit a given package configuration. Alternate dividers may be provided in a kit, as well as alternate side guides, so as to provide even more flexibility.

Some of the lane dividers can include slots 182 to allow for use of a sensor system 184, such as a conventional optical system to note when a group or articles reaches that point. The sensor system can be used to trigger other parts of the system, such as an upstream or downstream conveyor, shrink-wrapping assembly, etc. Thus, once a substantially nested group of objects passes sensor system 184, it may be desirable to begin feeding a sheet 186 for wrapping the group. Such sensors could be other types and could be located at other places as well. The sensors 184 may be in communication with a conventional programmable logic controller (PLC) 188, which can also control and receive input from all parts of the device and upstream and downstream devices as well.

Figure 7:
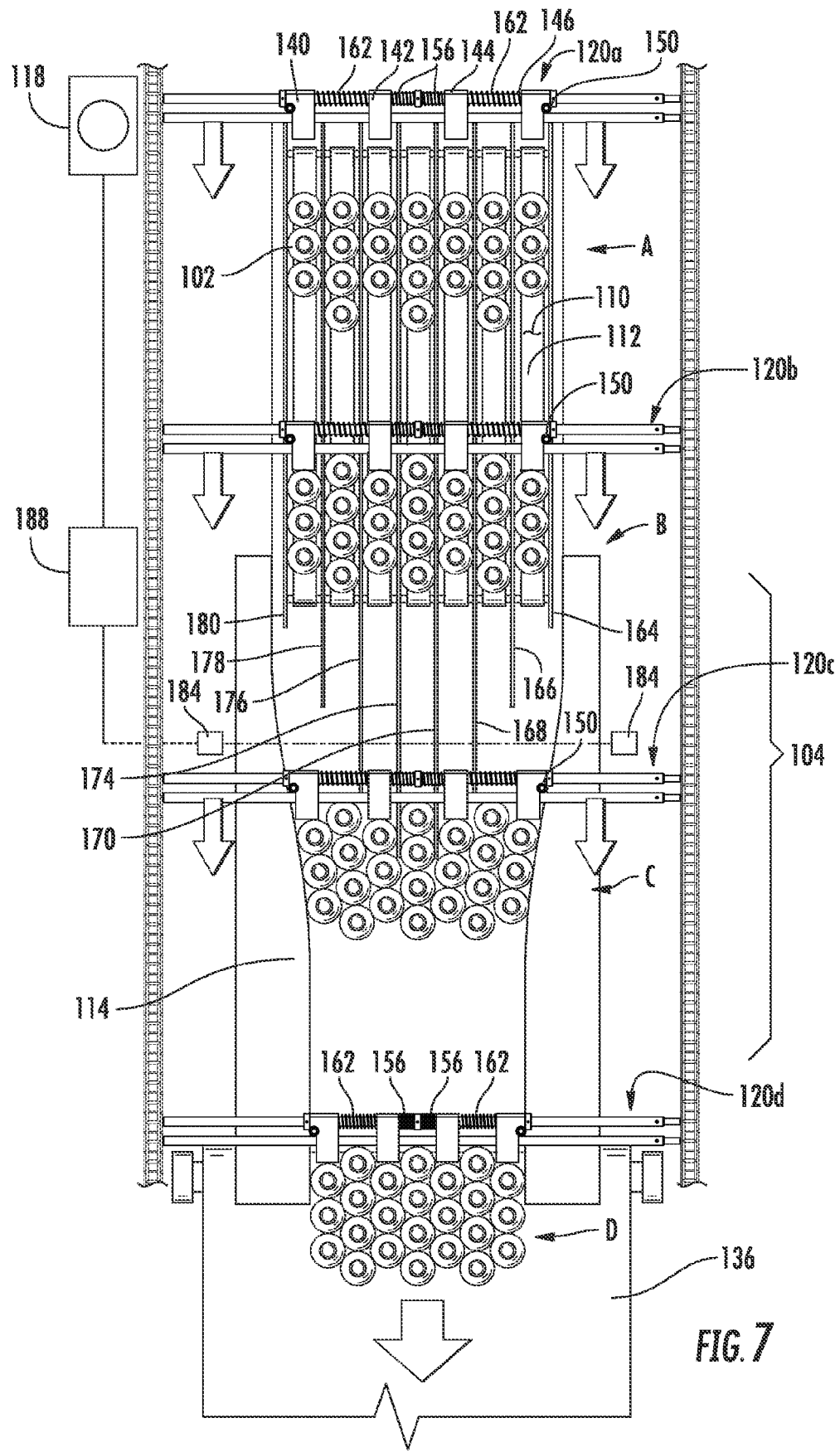
FIG. 7 is a top schematic view of the progression of objects as being nested in a nesting zone of a nesting assembly.

FIG. 7 shows and overview of four groups A-D of objects passing though nesting zone 104 from seven (not eight) rows 110. As shown, each row includes a desired number of objects 102. The number of objects in each row can be controlled upstream of nesting zone by conventional flow separation devices, such as movable knife, pin or bar devices. The number of objects in each row may be identical, or different (as shown).

Group A is still on conveyors 112 and being moved by the conveyors. Flight bar assembly 120*a* is moving in to contact group A. Spacers 140-146 extend along four of the lanes, with interleaved lanes having no spacer. The flight bars 120 move faster than the groups so that the flight bars catch and push the groups into the nesting zone 104.

Group B is being pushed by flight bar 120*b*. Spacers 140-146 are pushing objects 102 in their respective rows forward by approximately one-half of the width of an object. Lane dividers 164-180 (no spacer 172 here) are still keeping the individual rows separated.

Group C is being nested. Most objects 102 have passed their respective lane dividers. Cam followers 150 and outer objects 102 are being urged inwardly by surfaces 128. Spring members 156 and 162 are compressing moving in the spacers, more laterally outwardly than inwardly.

Group D is nested and is leaving the nesting zone 104 and dead plate 114 for downstream conveyor 136. Spring members 156 are fully compressed and spacers are in their final position. Flight bar 120*d* is about to rise, releasing the spring members and returning the spacers to the position of Group A. Flight bar 120d will then be driven on chains 122 to repeat the process.

Note that spacers 140-146 should initially be spaced so that they are aligned with appropriate rows, taking into account object thickness and lane divider thickness. Preferably, spacers should have a width laterally slightly less than that of the objects so that no pinching occurs during nesting. When nested, centers of objects two rows apart are less than two object widths apart. Therefore, when in position of Group D, the centers of adjacent spacers should have such spacing as well.

Figure 8A:
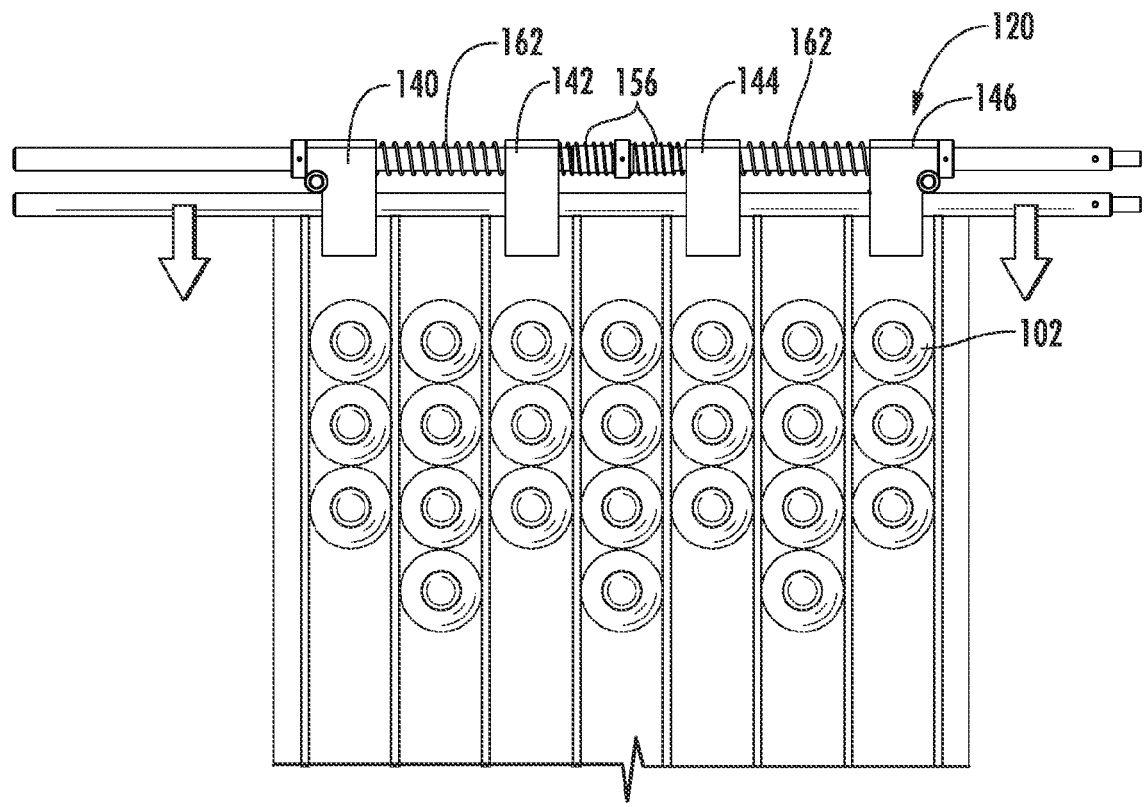
FIGS. 8A through 8G are close up top diagrammatical views of objects showing the nesting process.
Figure 8B:
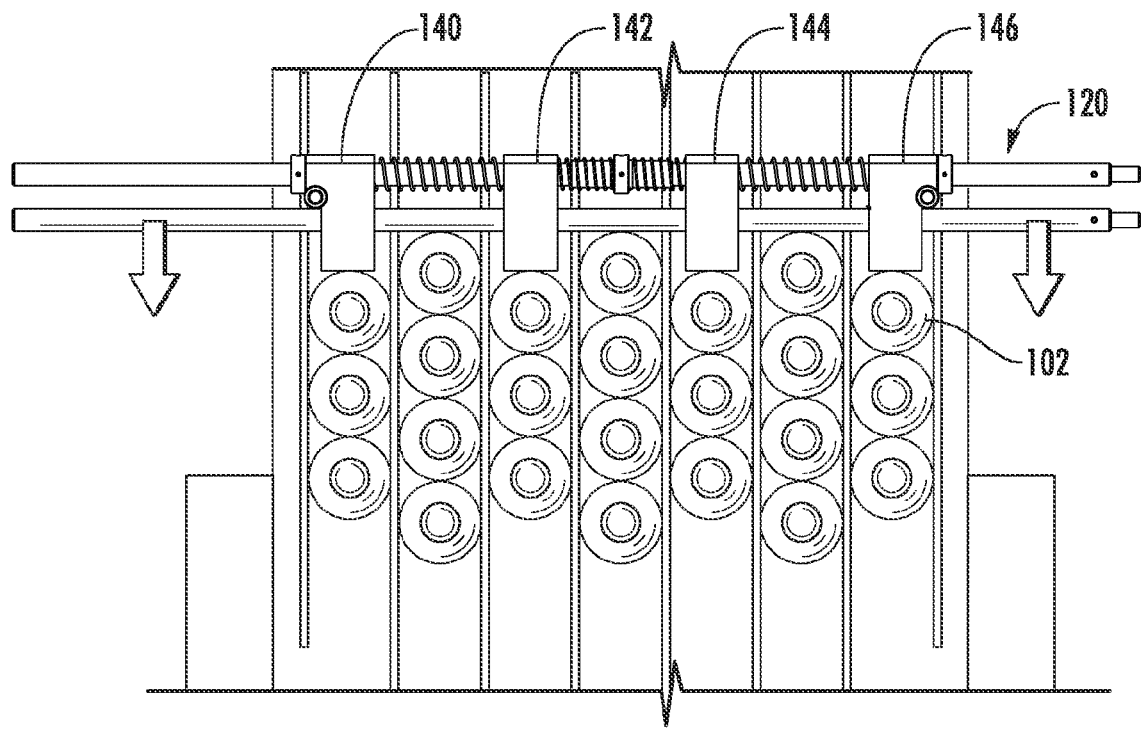
Figure 8C:
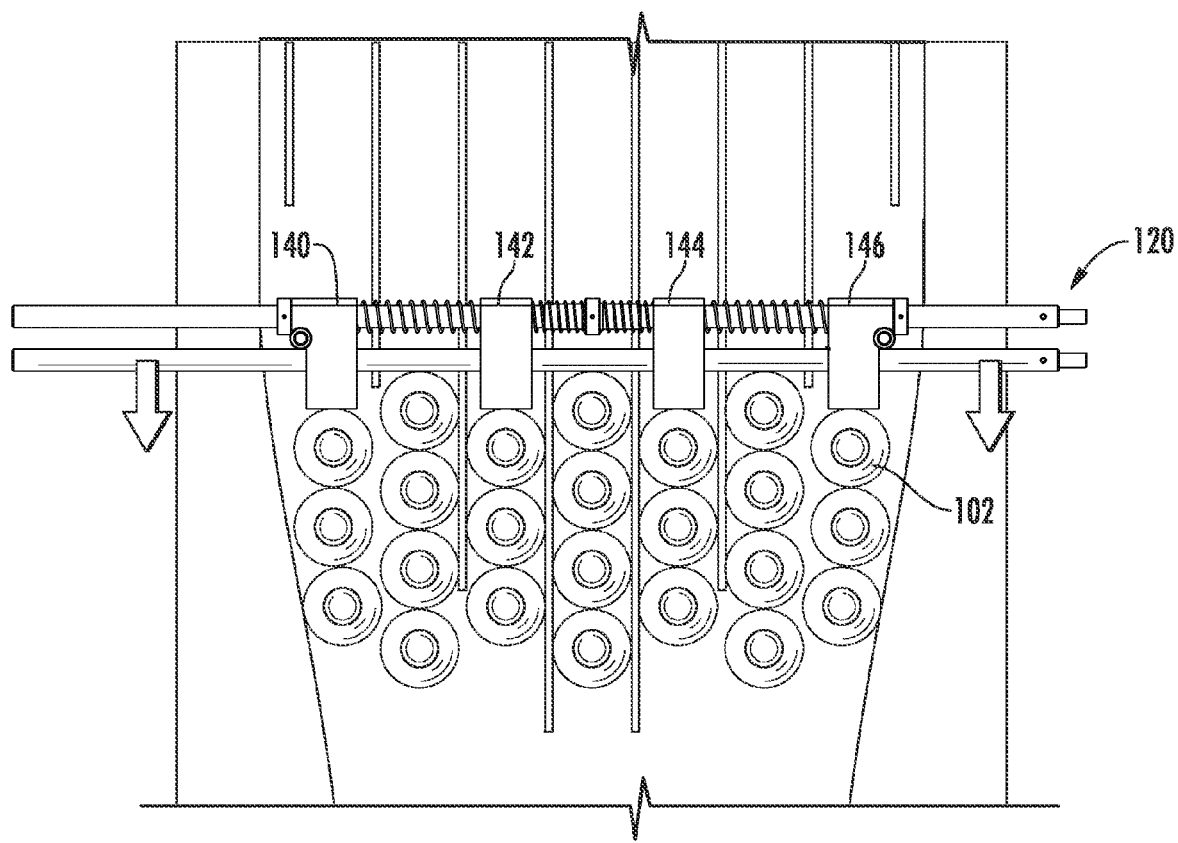
Figure 8D:
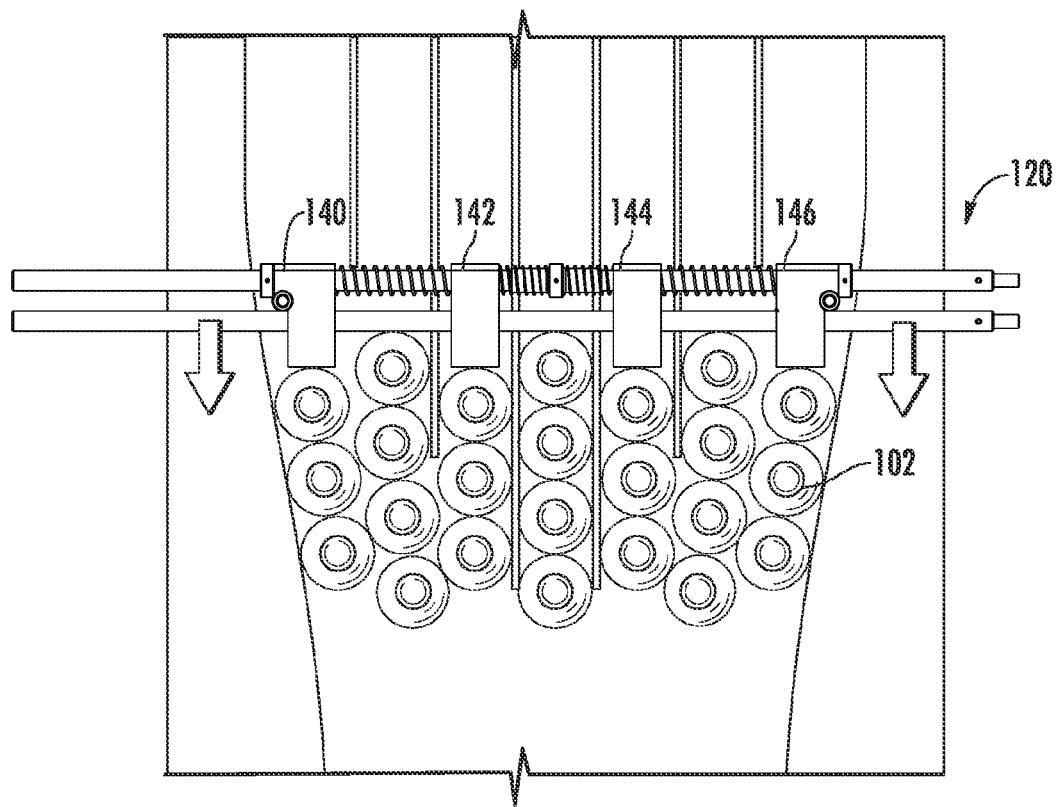
Figure 8E:
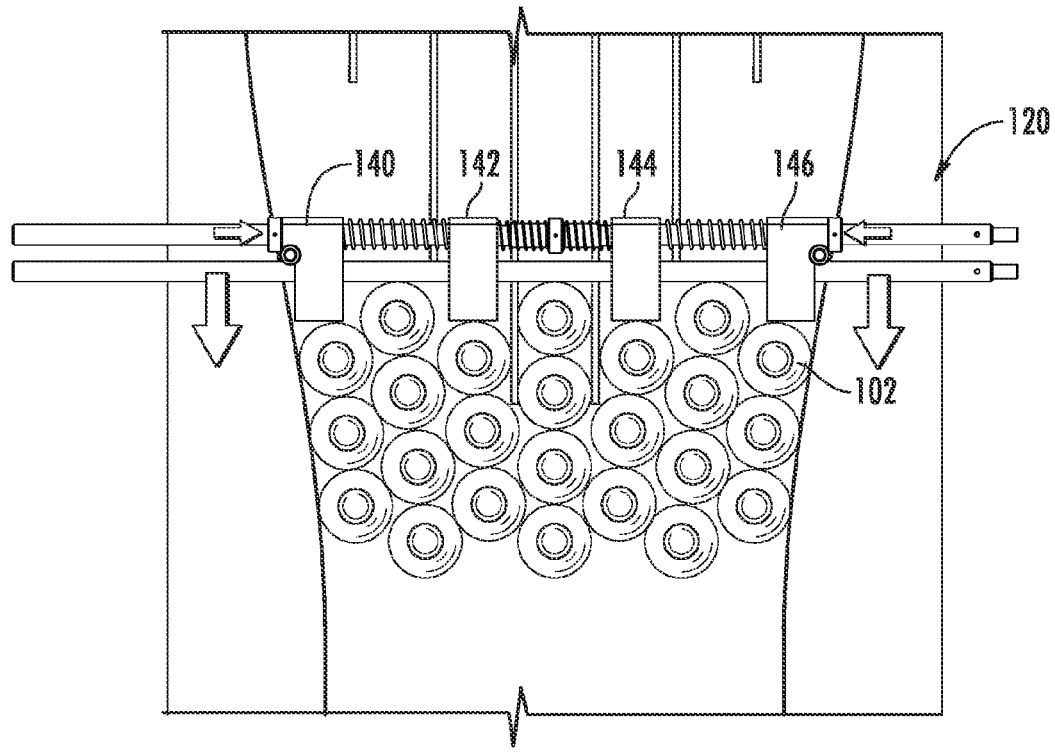
Figure 8F:
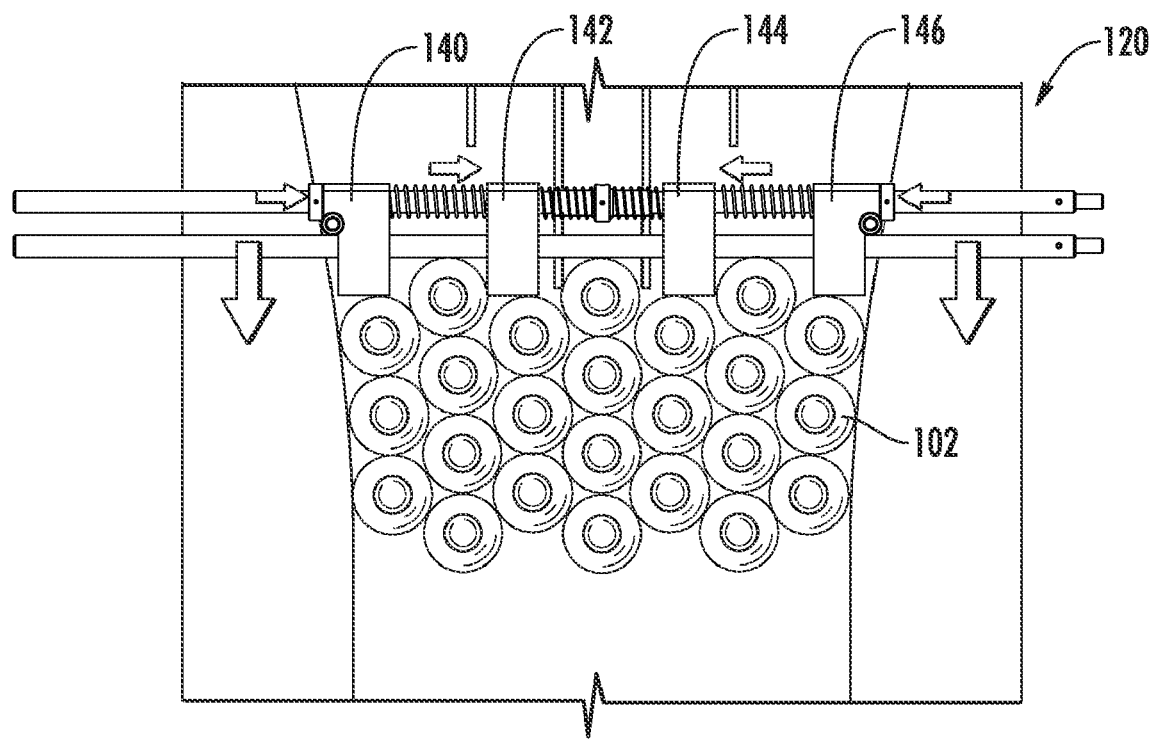
Figure 8G:
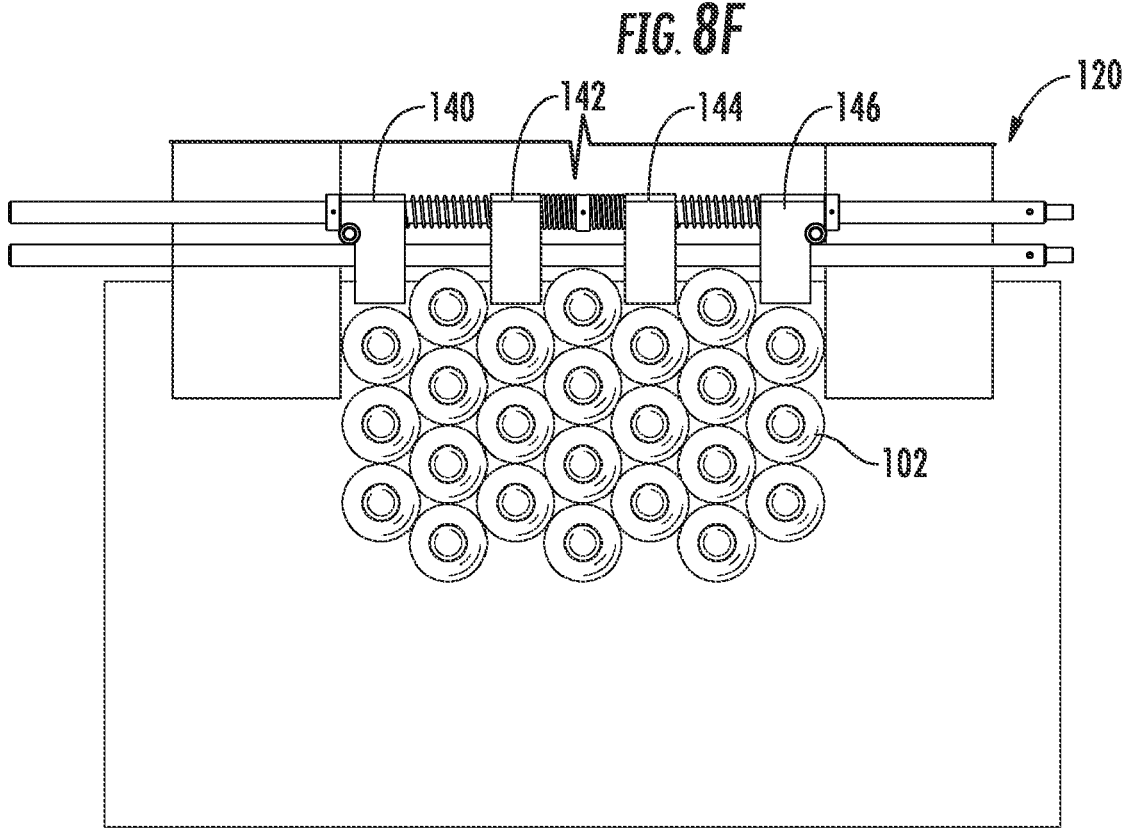

FIGS. 8A though 8G show more details of the nesting process shown in FIG. 7. As illustrated, nesting staggered rows on each side one at a time (compare 8C, 8D and 8F) from the outside in provides a reliable nesting method. By making spacers 140-146 movable, the reliability is improved through the nesting zone.

Figure 9:
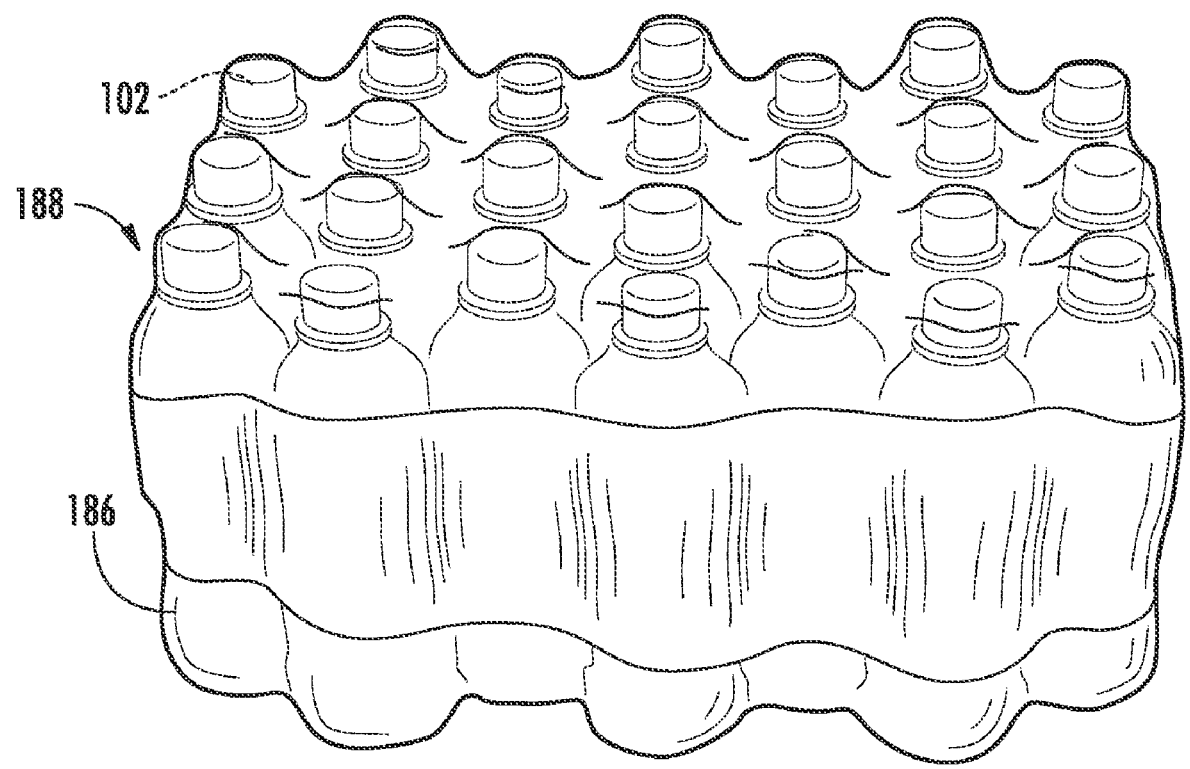
FIG. 9 is a perspective view showing an example of a shrink-wrapped package including nested objects.

FIG. 9 shows a resulting package 188 wrapped by sheet 186. No limitation as to the type of sheet or other holding member should be assumed. Therefore, the present nesting disclosure could be used for various purposes, such as palletizing, box loading, tray loading etc. However, such nesting in a staggered, hexagonal and/or honeycomb shape does provide improved stability to a group of articles as compared to a typical orthogonal "grid" grouping. As shown, objects in a nested arrangement typically contact more objects in more directions than in an orthogonal arrangement. Therefore, a package 188 may not need a sheet or tray beneath the objects for support. Also, alterative groupings and novel package shapes can be employed by simply positioning a nested number of objects and wrapping them.

The remaining figures show further options, where like or identical reference numerals are used on like or identical elements. FIGS. 10 and 11 show an alternate flight bar assembly 220, including a non-circular, in this case hexagonal, flight bar 238. The openings in spacers 240-246 can be configured to cooperate with flight bar 238 to prevent rotation of the spacers, thereby avoiding a second orienting bar as above. Otherwise, operation and configuration of flight bar assembly 220 is substantially similar to those above.

Figure 12:
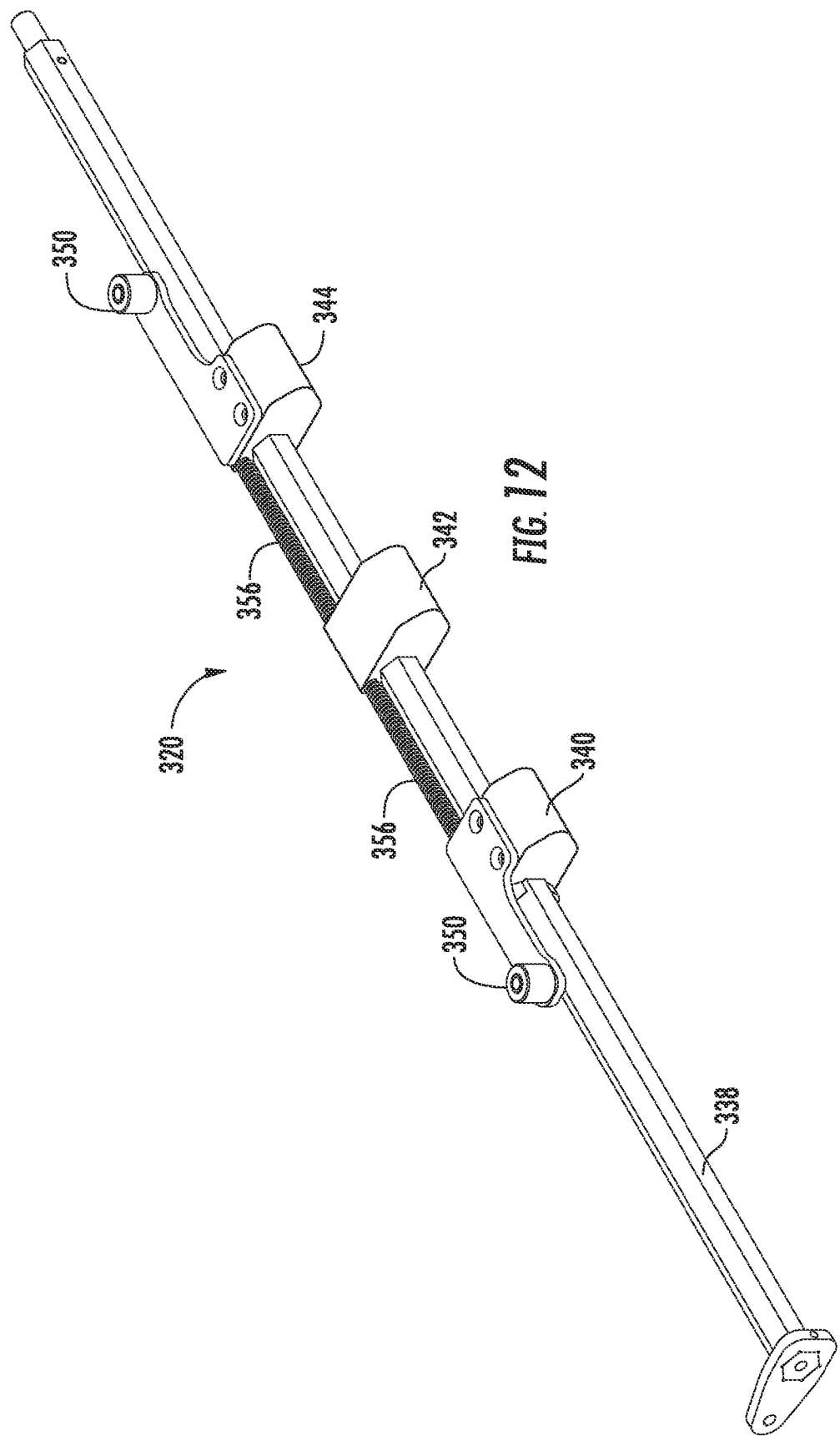
FIG. 12 is a top view of another possible flight bar assembly.

FIG. 12 shows a modified flight bar assembly 320, having only three spacers 340-344. In this case, middle spacer 342 could be fixed, eliminating the need for an anchor. Also, only two spring members 356 are needed. Flight bar assembly 330 could be used where a different or a narrower packaging is desired having a differing arrangement or fewer rows. It should be understood that the concepts of this disclosure can be used on packages have many fewer or more rows than those disclosed, as desired to suit a particular application.

Figure 13:
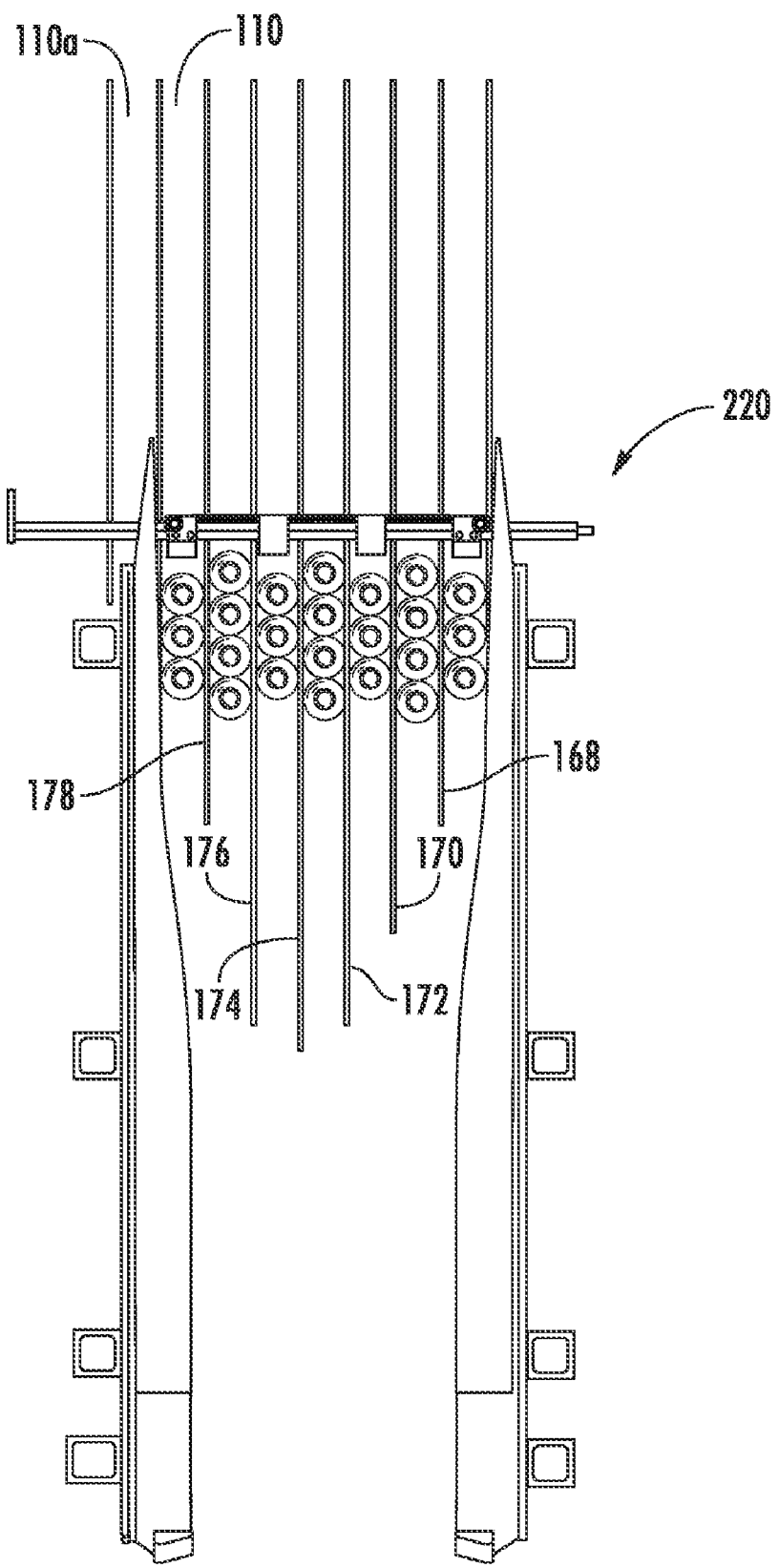
FIG. 13 is a top view showing one possible nesting assembly using the flight bar assembly of FIG. 10.
Figure 14:
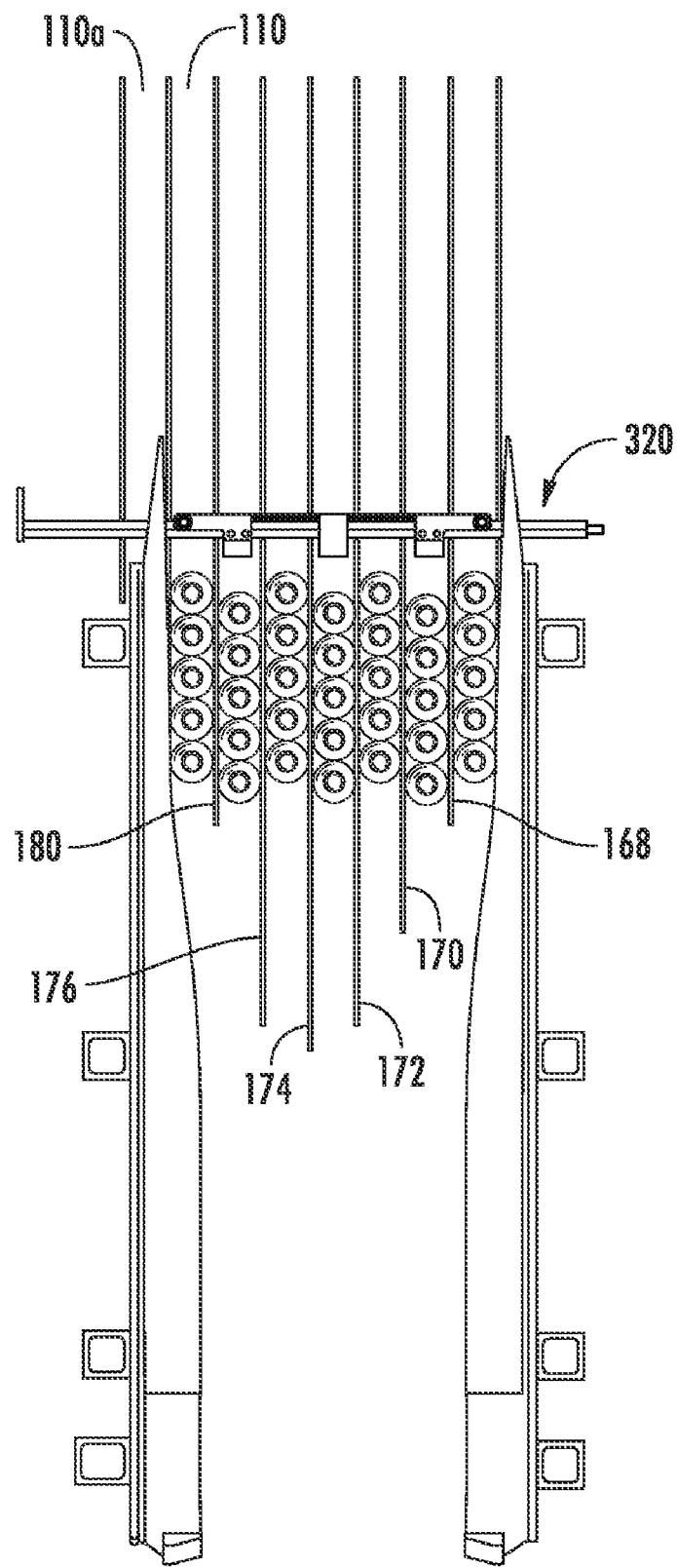
FIG. 14 is a top view showing one possible nesting assembly using the flight bar assembly of FIG. 12.

FIGS. 13 and 14 show uses of flight bar assemblies 220 and 320 respectively for different package grouping configurations. As shown in FIG. 13, seven lanes are used, with an alternating three/four object grouping. As shown in FIG. 14, seven lanes are used with constant five object grouping. Note that the left most row 110*a* is not used and the left most lane divider 180 has been moved over one spot to take the place of divider 178 in each arrangement to allow for smooth nesting without pinching in the nesting zones. Also, the left side guide 126 has been moved over one lane as well. Use of movable or changeable lane dividers and side guides allows for great flexibility in achieving a desired grouping within minimal expense, effort and down time.

Accordingly, a method of using various of the above structures or others to package is also encompassed by this disclosure. Such a method of nesting may include feeding objects 102 in a feed direction F in plurality of rows 110 into a nesting zone 104. The method can be carried out by selectively maintaining separation of the rows 110 via lane dividers 164-180 between the rows. The various lane dividers may have differing lengths extending into the nesting zone 104. The method can include pushing the rows of objects into the nesting zone using a flight bar assembly 120, etc., including a flight bar and spacers extending forward from the flight bar in the feed direction. At least one of the spacers can be a slidable spacer that is laterally slidable along the flight bar. The spacers have a lateral width less than a width of the one of the objects and extend forward of the flight bar a length approximately equal to one one-half of the width of one of the objects. The spacers are arranged to contact and push every other row 110 of the objects with another row of the objects in between. The method can further include sliding at least some of the spacers laterally inward relative to the flight bar while in the nesting zone 104 as the rows of objects exit the lane dividers while also urging the outermost rows of objects inward to achieve a hexagonally nested arrangement of objects.

Again, use of the term "hexagonally" should not be considered limiting. As shown, the objects are spaced at 60 degree angles in a honeycomb or staggered position. This assumes that the objects are symmetrical and perhaps circular. Differently shaped articles may not align in a perfect "hexagonal" arrangement, although they could be staggered and efficiently nested. Further mixing different sizes of articles in a nested group might not achieve a perfect hexagonal arrangement either, yet still achieve an acceptable package. Finally, even with symmetrical circular objects, any other arrangements achievable though the geometry of the objects and non-orthogonal would be within the scope of the invention if nested.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. An apparatus for nesting objects in a substantially staggered arrangement, the objects being received from an object feed in a plurality of groups in substantially parallel rows extending along a feed direction, the nesting apparatus comprising:
 a flight bar drive;
 a flight bar assembly including a flight bar extending laterally across the feed direction and driven by the flight bar drive through a nesting zone in the feed direction, the flight bar pushing the plurality of groups through the nesting zone, the flight bar assembly including at least one spacer extending forward of the flight bar when in the nesting zone for contacting an object in one of the groups to push the one group forward of others of the groups, the spacer being slidable laterally along the flight bar as the flight bar moves through the nesting zone, the spacer maintaining contact with the object in the one of the groups as the spacer slides laterally, the spacer having a lateral width approximately equaling a width of one of the objects, the spacer extending forward of the flight bar a length approximately equal to one-half of the width of one of the objects; and
 at least one guide extending along one side of the nesting zone, the guide having a contact surface for moving at least one of the groups of objects laterally within the nesting zone while the flight bar pushes all of the groups through the nesting zone, wherein the flight bar, the spacer on the flight bar, and the guide are configured with respect to the objects so as to cooperate in nesting the objects into a substantially staggered arrangement during travel through the nesting zone.

2. The apparatus of claim 1, wherein the flight bar assembly includes a spring member for urging the spacer laterally outward toward the guide.

3. The apparatus of claim 2, wherein the flight bar assembly includes a cam follower, the cam follower being urged laterally inward thereby compressing the spring member as the flight bar moves through the nesting zone.

4. The apparatus of claim 3, wherein the flight bar assembly further includes a second spacer slidably disposed on the flight bar laterally between the spacer and the guide, the spring member being disposed between a central anchor and the spacer and having a first spring constant, the flight bar assembly further including a second spring member disposed between the spacer and the second spacer and having a second spring constant, the spring constant of the spring and the spring constant of the second spring being inversely proportional to a distance moved by the respective spacer and second spacer.

5. The apparatus of claim 4, wherein the cam follower is located on the second spacer.

6. The apparatus of claim 4, further including a second guide located opposite the guide, the guide and the second guide having respective contact surfaces that are nearer each other in a downstream portion of the nesting zone.

7. The apparatus of claim 1, further including a plurality of lane dividers extending along the feed direction into the nesting zone, each lane divider disposed between two of the rows.

8. The apparatus of claim 7, wherein the lane dividers extend to differing lengths within the nesting zone.

9. The apparatus of claim 8, wherein the lane dividers in a central portion of the nesting zone extend further than the lane dividers in lateral portions of the nesting zone.

10. The apparatus of claim 1, further including a dead plate disposed beneath a substantial portion of the nesting zone.

11. The apparatus of claim 10, further include a plurality of single-row conveyors disposed upstream of the dead plate for feeding the objects to the nesting zone and a single nested-group conveyor disposed downstream of the dead plate for transferring nested groups of objects from the nesting zone.

12. The apparatus of claim 1, wherein the flight bar and spacer are cooperatively configured so as to substantially prevent rotation of the spacer relative to the bar while pushing the objects.

13. The apparatus of claim 12, wherein the flight bar has a non-circular cross-section.

14. The apparatus of claim 12, wherein the flight bar assembly includes an orienting bar extending parallel to the flight bar and through the spacer.

15. A flight bar assembly for a nesting assembly configured for pushing objects in a feed direction while allowing lateral movement so as to achieve a staggered nesting pattern, the flight bar assembly comprising:
  a flight bar extending laterally across the feed direction;
  a plurality of spacers extending in the feed direction from the flight bar, at least one of the spacers being a slidable spacer that is laterally slidable along the flight bar, the spacers having a lateral width less than a width of the one of the objects, the spacers extending forward of the flight bar a length approximately equal to one-half of the width of one of the objects;
  a least one compression spring for urging the slidable spacer toward an end of the flight bar and away from a center of the flight bar; and
  a cam follower operatively engaged with the slidable spacer, whereby pushing the cam follower toward the center of the flight bar slides the slidable spacer toward the center of the flight bar by compressing the compression spring member.

16. The flight bar assembly of claim 15, wherein centers of the spacers are disposed a first distance apart when the compression spring is in a default position and a smaller second distance apart when the compression spring is moved inward by the cam follower.

17. The flight bar assembly of claim 16, wherein the first distance corresponds to two times the width of one the objects and the second distance corresponds to less than two times the width of the one of the objects.

18. The flight bar assembly of claim 17, wherein the second distance corresponds to the lateral distance between the centers of three rows of the objects nested hexagonally.

19. The flight bar assembly of claim 15, wherein the flight bar and spacers are cooperatively configured so as to substantially prevent rotation of the spacers relative to the bar while pushing the objects.

20. The flight bar assembly of claim 19, wherein the flight bar has a non-circular cross-section.

21. The flight bar assembly of claim 19, wherein the flight bar assembly includes an orienting bar extending parallel to the flight bar and through the spacer.

22. The flight bar assembly of claim 15, wherein a second one of the spacers is also slidable, the second spacer slidably disposed on the flight bar laterally between the spacer and the guide, the compression spring being disposed between a central anchor and the spacer and having a first spring constant, the flight bar assembly further including a second spring member disposed between the spacer and the second spacer and having a second spring constant, the spring constant of the spring member and the spring constant of the second spring member being inversely proportional to a distance moved by the respective spacer and second spacer.

23. A method of nesting objects comprising:
  feeding objects in a feed direction in plurality of rows into a nesting zone;
  selectively maintaining separation of the rows via lane dividers between the rows, the lane dividers having differing lengths extending into the nesting zone;
  pushing the rows of objects into the nesting zone using a flight bar assembly, the flight bar assembly having a flight bar and spacers extending forward from the flight bar in the feed direction, at least one of the spacers being a slidable spacer that is laterally slidable along the flight bar, the spacers having a lateral width less than a width of the one of the objects, the spacers extending forward of the flight bar a length approximately equal to one-half of the width of one of the objects, the spacers arranged to contact and push every other row of the objects with a row of the objects in between; and
  sliding at least some of the spacers laterally inward relative to the flight bar while in the nesting zone as the rows of objects exit the lane dividers while urging the outermost rows of objects inward to achieve a staggered nested arrangement of objects.

* * * * *

UNITED STATES PATENT AND TRADEMARK OFFICE
CERTIFICATE OF CORRECTION

| | | |
|---|---|---|
| PATENT NO. | : 8,235,201 B2 | Page 1 of 1 |
| APPLICATION NO. | : 12/490967 | |
| DATED | : August 7, 2012 | |
| INVENTOR(S) | : Miller et al. | |

It is certified that error appears in the above-identified patent and that said Letters Patent is hereby corrected as shown below:

Column 9, line 42 after the words "width of", please delete "the"

Column 9, line 46 at the beginning of the line, please delete "a" and insert --at--

Signed and Sealed this
Thirteenth Day of November, 2012

David J. Kappos
*Director of the United States Patent and Trademark Office*